(12) United States Patent
Kobori et al.

(10) Patent No.: US 12,233,669 B2
(45) Date of Patent: Feb. 25, 2025

(54) TIRE FOR MOTORCYCLE FOR RUNNING ON ROUGH TERRAIN

(71) Applicant: SUMITOMO RUBBER INDUSTRIES, LTD., Kobe (JP)

(72) Inventors: Shuji Kobori, Kobe (JP); Yoshimasa Ueda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/106,561

(22) Filed: Feb. 7, 2023

(65) Prior Publication Data
US 2023/0278370 A1    Sep. 7, 2023

(30) Foreign Application Priority Data

Mar. 2, 2022    (JP) ................................ 2022-031548
Mar. 17, 2022    (JP) ................................ 2022-042705

(51) Int. Cl.
*B60C 11/11*    (2006.01)
*B60C 11/13*    (2006.01)

(52) U.S. Cl.
CPC .......... *B60C 11/11* (2013.01); *B60C 11/1323* (2013.01); *B60C 11/1376* (2013.01); *B60C 2200/10* (2013.01); *B60C 2200/14* (2013.01)

(58) Field of Classification Search
CPC . B60C 11/11; B60C 2200/10; B60C 2200/14; B60C 11/042; B60C 11/045;

(Continued)

(56) References Cited

U.S. PATENT DOCUMENTS

2002/0092591 A1*   7/2002  Cortes ................. B60C 11/0309
                                              152/209.16
2011/0308681 A1   12/2011  Nakamura
(Continued)

FOREIGN PATENT DOCUMENTS

CN       202826988 U  *  3/2013
EP       3 199 377 B1     3/2020
(Continued)

OTHER PUBLICATIONS

Extended European Search Report for European Application No. 23156647.2, dated Jul. 4, 2023.

*Primary Examiner* — Cedrick S Williams
*Assistant Examiner* — Thomas Frank Schneider
(74) *Attorney, Agent, or Firm* — Birch, Stewart, Kolasch & Birch, LLP

(57) ABSTRACT

A tread portion 2 of a tire 1 includes a plurality of shoulder blocks 11 and a plurality of middle blocks 12. An inner edge 11B in the tire axial direction of a tread surface of each shoulder block 11 protrudes on an outer side in a tire radial direction with respect to a virtual profile 18. A side surface S on the inner side in the tire axial direction of each shoulder block 11 includes one first side surface S1 extending from the inner edge 11B toward a groove bottom, and at least one second side surface S2 extending from a bottom side end of the first side surface S1 toward the groove bottom, and the second side surface S2 is a surface inclined toward the inner side in the tire axial direction relative to the first side surface S1.

8 Claims, 10 Drawing Sheets

(58) Field of Classification Search
CPC . B60C 11/046; B60C 11/01; B60C 2011/013; B60C 11/0306; B60C 11/0309; B60C 11/1323; B60C 11/13
See application file for complete search history.

(56) References Cited

U.S. PATENT DOCUMENTS

2013/0306207 A1* 11/2013 Matsumura ............. B60C 11/11
152/209.15
2016/0152088 A1   6/2016 Megevand et al.

FOREIGN PATENT DOCUMENTS

| EP | 3 744 540 B1 | | 12/2021 |
|---|---|---|---|
| JP | S60203505 A | * | 10/1985 |
| JP | 2020121640 A | * | 8/2020 |
| JP | 2020-189555 A | | 11/2020 |

\* cited by examiner 11  11B  12A  12 a c b

TIRE FOR MOTORCYCLE FOR RUNNING ON ROUGH TERRAIN

CROSS REFERENCE TO RELATED APPLICATION

This application claims priority on Japanese Patent Application No. 2022-31548 filed in Japan on Mar. 2, 2022 and Japanese Patent Application No. 2022-42705 filed in Japan on Mar. 17, 2022. the entire contents of which are incorporated herein by reference.

TECHNICAL FIELD

The present invention relates to tires for a motorcycle. Specifically, the present invention relates to tires suitable for a motorcycle that runs on rough terrain.

BACKGROUND ART

A fire for a motorcycle for running on rough terrain tends to be used with a lower internal pressure than a tire for running on a paved road surface. In particular, a tire for a trial competition on rough terrain is used, for example, with a low internal pressure of 30 to 40 KPa.

Therefore, the tread portion of the tire for a motorcycle for running on rough terrain easily becomes deformed according to the irregularities of a road surface. Accordingly, a large contact pressure is applied to each of shoulder blocks and middle blocks, and these blocks contribute to exhibiting grip performance.

Japanese Laid-Open Patent Publication No. 2020-121640 describes a method in which each shoulder block is caused to protrude on the radially outer side with respect to a tread surface in the above tire for a motorcycle, thereby increasing the contact pressure during load application to improve grip performance.

SUMMARY OF THE INVENTION

Technical Problem

If the protrusion amount of the shoulder block is increased in order to make the contact pressure during load application higher, the middle block may be lifted from a road surface due to the difference in height between the shoulder block and the middle block, resulting in a sudden decrease in grip.

Moreover, since the tread portion easily becomes deformed, the shoulder block may also fall down toward the tread center side during high load application, resulting in a sudden decrease in grip.

If a large camber angle is given to the tire, the contact pressure is increased at the inner edge of the shoulder block. As described above, the tread portion easily becomes deformed. When a high load is applied to the shoulder block, the shoulder block may excessively fall down toward the tread center side. In this case, the tire cannot exhibit sufficient grip performance.

A large camber angle means that the tire is tilted relative to a road surface to the degree that the land surface of the shoulder block is included in a ground-contact surface.

As a result of various experiments, the present inventors have obtained findings that the above problems can be solved by not only causing each shoulder block to protrude toward the outer side in the tire radial direction and but also making the root side of each shoulder block thicker to suppress bending (or falling-down) of the shoulder block, and have completed the present invention.

The present invention has been made in view of the above circumstances, and an object of the present invention is to provide a tire, for a motorcycle for running on rough terrain, which can exhibit excellent grip performance.

Solution to Problem

A tire for a motorcycle for running on rough terrain according to the present invention includes a tread portion. The tread portion includes a plurality of blocks raised from a groove bottom surface. The plurality of blocks include a plurality of shoulder blocks forming tread ends, and a plurality of middle blocks adjacent to inner sides in a tire axial direction of the shoulder blocks. In a meridian cross-section including a tire rotation axis in a normal state which is a state where the tire is fitted on a normal rim with a normal internal pressure and no load is applied to the tire, an inner edge in the tire axial direction of a land surface of each shoulder block protrudes on an outer side in a tire radial direction with respect to a virtual profile obtained by extending a profile of a land surface of the middle block to the shoulder block. A side surface on the inner side in the tire axial direction of each shoulder block includes one first side surface extending from the inner edge toward a groove bottom, and at least one second side surface extending from a bottom side end of the first side surface toward the groove bottom. The second side surface is a surface inclined toward the inner side in the tire axial direction relative to the first side surface.

In the dire for a motorcycle for running on rough terrain according to the present invention, preferably, the first side surface includes a flat surface, the number of the second side surfaces is one, and the one second side surface includes a flat surface.

In the tire for a motorcycle for running on rough terrain according to the present invention, preferably, when an angle formed by the second side surface and a first virtual surface obtained by extending the first side surface toward an inner side in the tire radial direction is denoted by $\alpha$ and an angle formed by the first side surface and a second virtual surface connecting an outer edge and the inner edge in the tire axial direction of the land surface of the shoulder block is denoted by $\beta$, $\alpha$ and $\beta$ satisfy the following inequalities, $0° < \alpha \leq 120°$, and $50° \leq \beta \leq 120°$.

In the tire for a motorcycle for running on rough terrain according to the present invention, preferably, an outer edge in the tire axial direction of the land surface of the shoulder block extends parallel to a tire circumferential direction.

In the tire for a motorcycle for running on rough terrain according to the present invention, preferably, a protrusion amount of the shoulder block is not less than 0.5 mm and not greater than 5.0 mm.

In the tire for a motorcycle for running on rough terrain according to the present invention, preferably, a rubber hardness at room temperature of 25° C. of the tread portion is not less than 40 and not greater than 70.

In the tire for a motorcycle for running on rough terrain according to the present invention, preferably, when, in the meridian cross-section including the tire rotation axis, a line segment connecting the bottom side end of the first side surface and a bottom side end of a side surface on the outer side in the tire axial direction of the shoulder block is a first reference line, a line segment connecting a groove bottom between the shoulder block and the middle block and the first reference line and tangent to the groove bottom surface at the groove bottom is a second reference line, an area of a region surrounded by a land surface of the shoulder block, the first side surface, the first reference line, and the side surface on the outer side is defined as a main body area, and an area of a region surrounded by the second side surface, the second reference line, and the first reference line is defined as a mountain portion area, a ratio of the mountain portion area to the main body area is not less than 5%.

In the tire for a motorcycle for running on rough terrain according to the present invention, preferably, an angle formed by the first reference line and the second side surface is not less than 40° and not greater than 170°.

In the tire for a motorcycle for running on rough terrain according to the present invention, preferably, a ratio of a distance in the axial direction from a tire equator plane to the bottom side end of the first side surface to a distance in the axial direction from the tire equator plane to the tread end is not less than 65%.

Advantageous Effects of the Invention

According to the present invention, it is possible to provide a tire, for a motorcycle for running on rough terrain, which can exhibit excellent grip performance.

DETAILED DESCRIPTION

The following will describe in detail the present invention based on preferred embodiments with appropriate reference to the drawings.

In the present disclosure, the "normal state" is a state where a tire is fitted on a normal rim, the tire internal pressure is adjusted to a normal internal pressure, and no load is applied to the tire. Hereinafter, unless otherwise specified, dimensions and the like of components of the tire are values measured in the normal state.

The "normal rim" is a rim that is defined, in a standard system including a standard on which the tire is based, by the standard for each tire, and means, for example, the "standard rim" in the JATMA standard, the "Design Rim" in the TRA standard, or the "Measuring Rim" in the ETRTO standard.

The "normal internal pressure" is an air pressure that is defined by the standard for each tire, and means the maximum air pressure in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

First Embodiment

The following will describe a first embodiment of the present invention with reference to the drawings.

Figure 1:
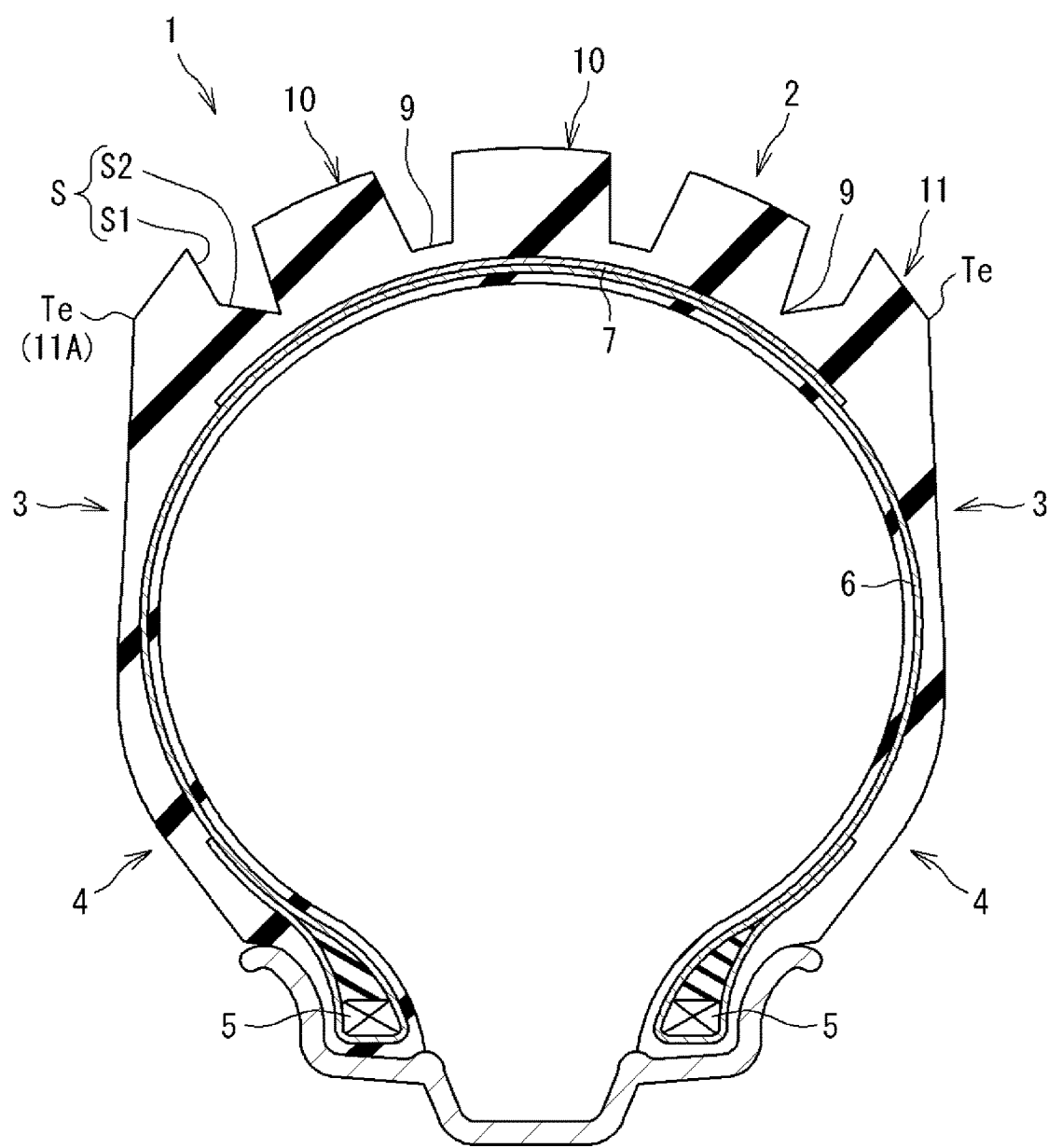
FIG. 1 is a cross-sectional view of a tire according to a first embodiment of the present invention.

FIG. 1 illustrates a rear tire for a trial competition as an example of a tire for a motorcycle for running on rough terrain (hereinafter, also simply referred to as "tire") 1. Therefore, the tire 1 is used, for example, in a state of being tilled with a low internal pressure of 30 to 40 kPa.

FIG. 1 is a tire meridian cross-sectional view of the tire 1 including a tire rotation axis in a normal state.

Figure 2:
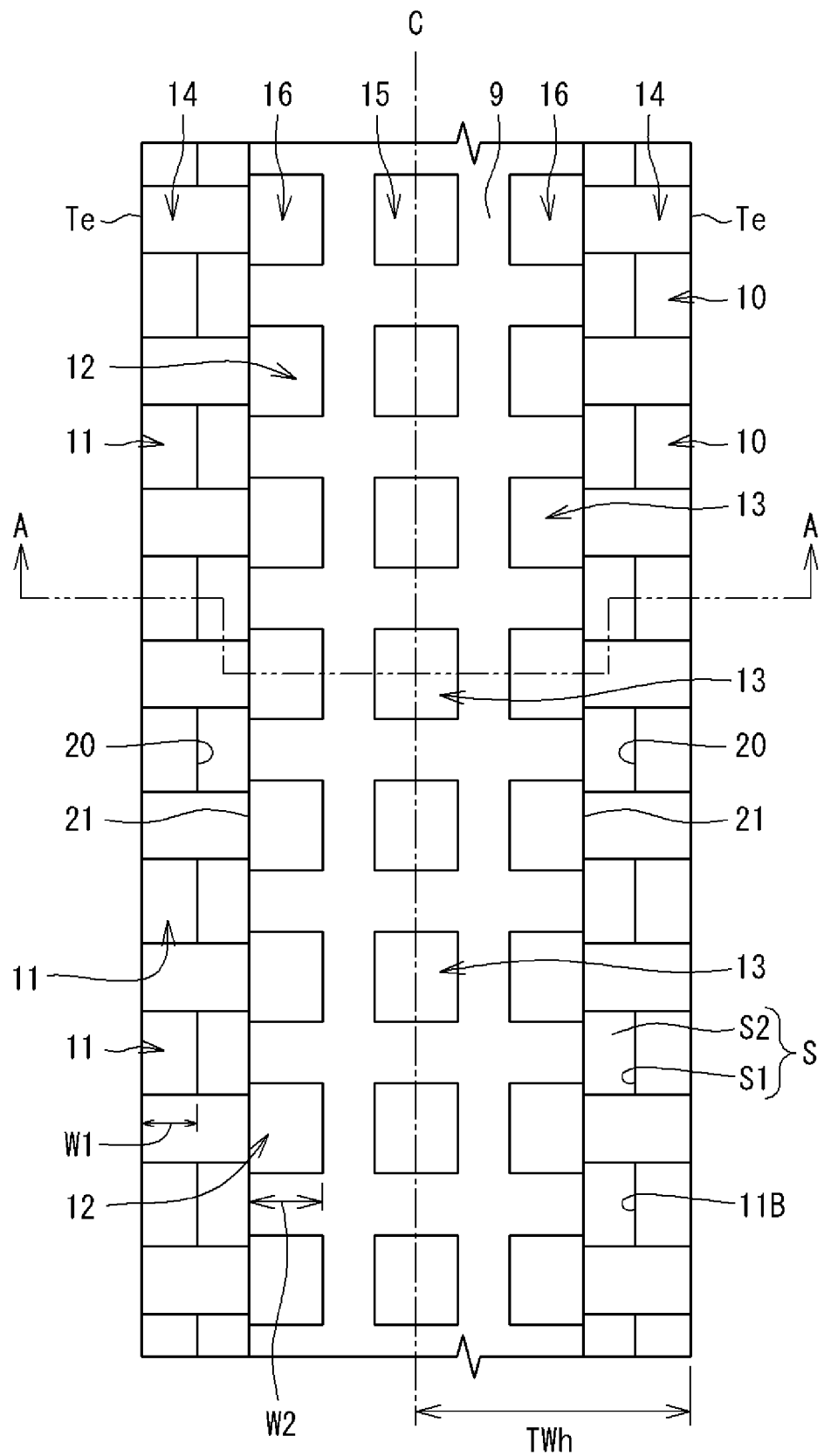
FIG. 2 is a development of a tread portion of the tire in FIG. 1.

FIG. 2 is a development of a tread portion 2 of the tire 1 in FIG. 1. FIG. 1 shows a cross-sectional view taken along a line A-A in FIG. 2.

As shown in FIG. 1, the tire 1 includes, for example, a carcass 6 and a belt layer 7.

The carcass 6 is formed, for example, in a torpid shape extending from the tread portion 2 through each sidewall portion 3 to a bead core 5 embedded in each bead portion 4.

The belt layer 7 is, for example, disposed outward of the carcass 6 in the tire radial direction and inside the tread portion 2 and reinforces the tread portion 2. For the carcass 6 and the belt layer 7, known configurations can be suitably adopted.

An outer surface between two tread ends Te of the tread portion 2 (also outer edges 11A in the tire axial direction of the land surfaces of shoulder blocks 11 described later), that is, the tread surface, is curved in an arc shape so as to be convex outward in the tire radial direction.

A plurality of blocks 10 are formed on the outer surface of the tread portion 2 so as to be raised from a groove bottom surface 9. Each tread end Te means, for example, the outermost edge in the tire axial direction of the block located on the outermost side in the tire axial direction among the blocks 10 formed in the tread portion 2.

The tread surface includes the land surfaces of the blocks 10. Of the tread surface, a portion other than the land surfaces is a groove.

As shown in FIG. 2, the tread portion 2 includes, for example, first regions 14, a second region 15, and third regions 16. Each first region 14 is a region from the tread end Te to 25% of a tread development half width TWh. The second region 15 is a region having a width that is 50% of the tread development half width TWh and having a center located at a tire equator C. Each third region 16 is a region between the first region 14 and the second region 15. The tread development half width TWh is the distance from the tire equator C to the tread end Te when the tread portion 2 is developed.

The blocks 10 include, for example, shoulder blocks 11, middle blocks 12, and crown blocks 13.

Each shoulder block 11 is a block that has a centroid located in the first region 14 and forms the tread end Te. Each middle block 12 is a block that has a centroid located in the third region 16. Each crown block 13 is a block that has a centroid located in the second region 15. In the tire 1 of the present embodiment, each crown block 13 is disposed, for example, on the tire equator C.

Each middle block 12 is adjacent to the inner side in the tire axial direction of the shoulder block 11. The middle block 12 overlaps at least a region obtained by extending the shoulder block 11 toward the inner side in the tire axial direction.

In the tire 1 of the present embodiment, the centroid of each middle block 12 is shifted from the centroid of the shoulder block 11 in the tire circumferential direction. However, the tire 1 of the present invention is not limited to such a mode.

Figure 3:
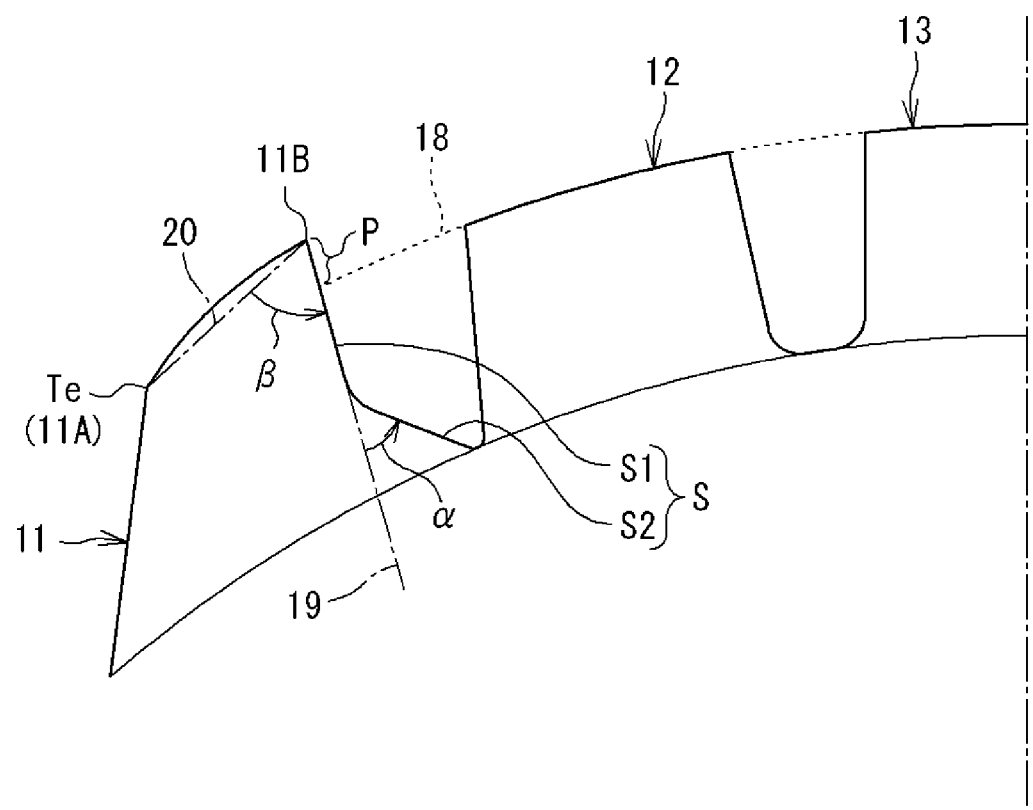
FIG. 3 is an enlarged cross-sectional view of a middle block and a shoulder block of the tire in FIG. 1.

FIG. 3 is an enlarged cross-sectional view of the middle block 12 and the shoulder block 11.

As shown in FIG. 3, in a meridian cross-section including the tire rotation axis in the normal state, an inner edge 11B in the tire axial direction of the land surface of the shoulder block 11 protrudes on the outer side in the tire radial direction with respect to a virtual profile 18 obtained by extending a profile of the land surface of the middle block 12 to the shoulder block 11.

By causing the shoulder block 11 to protrude as shown, the contact pressure during contact with a road surface can be increased, so that the grip force is improved. In addition, the inner edge 11B of the shoulder block 11 provides great grip.

In the tire 1 of the present embodiment, a protrusion amount P of the inner edge 11B from the virtual profile 18 is preferably in the range of 0.5 to 5.0 mm. In other words, the protrusion amount P of the shoulder block 11 is preferably not less than 0.5 mm and not greater than 5.0 mm.

This is because, if the protrusion amount P is less than 0.5 mm, the contact pressure is not increased and a grip force cannot be ensured. This is also because, if the protrusion amount P is greater than 5.0 mm, the shoulder block 11 excessively protrudes, and the middle block 12 is lifted from a road surface when a load is further applied, resulting in a significant decrease in grip.

The protrusion amount P is more preferably not less than 2.5 mm and further preferably not less than 3.0 mm, and is more preferably not greater than 4.5 mm and further preferably not greater than 4.0 mm.

As shown in FIG. 3, a side surface S on the inner side in the tire axial direction (synonymous with the tread center side) of the shoulder block 11 includes the following two side surfaces S1 and S2. Out of these side surfaces S, a second side surface S2 is a surface inclined toward the tread center side relative to a first side surface S1. Therefore, a root portion of the shoulder block 11 is shaped so as to become gradually thicker toward a groove bottom.

First side surface S1: one flat surface extending from the inner edge 11B toward the groove bottom.

Second side surface S2: one flat surface extending from the bottom side end of the first side surface S1 toward the groove bottom.

Here, when an angle formed by the second side surface S2 and a first virtual surface 19 obtained by extending the first side surface S1 toward the inner side in the tire radial direction is denoted by α and an angle formed by the first side surface S1 and a second virtual surface 20 connecting the outer edge 11A and the inner edge 11B in the tire axial direction of the land surface of the shoulder block 11 is denoted by β, α and β preferably satisfy the following inequalities.

$$0° < \alpha \leq 120°$$

$$50° \leq \beta \leq 120°$$

The reason for this is that the following disadvantages exist if α is larger than 120°.

1) If the angle is widened while the position at which the cross-sectional angle is changed is maintained, the cross-sectional area of the shoulder block 11 is increased, so that the stiffness of the root portion of the shoulder block 11 is increased, and the absorption properties during load application are significantly decreased.

2) If the cross-sectional area is maintained and the position at which the block cross-sectional angle is changed is located on the tire center side, the rubber volume of the root portion of the shoulder block 11 is insufficient, so that the shoulder block 11 falls inward when a load is applied. Therefore, the grip force is significantly decreased.

Therefore, when α and β are sea to angles within the above numerical ranges, the stiffness of the root portion of the shoulder block 11 can be optimized, so that the grip performance can be improved without impairing the absorption properties during load application. More preferable numerical ranges of α and β are as follows.

$$30° < \alpha \leq 80°$$

$$55° \leq \beta \leq 80°$$

A rubber hardness Hs of the tread portion 2 is preferably in the range of 40 to 70. The rubber hardness Hs of the tread portion 2 is preferably not less than 40 and not greater than 70. The rubber hardness Hs is a rubber hardness indicated by a type A durometer according to JIS-K6253.

This is because, if the rubber hardness Hs is less than 40, the rubber is excessively soft, so that each shoulder block 11 cannot be prevented from falling inward during load application. This is also because, if the rubber hardness Hs is greater than 70, the stiffness of the protrusion portion is significantly high, so that the absorption properties are deteriorated. A more preferable numerical range of the rubber hardness Hs of the tread portion 2 is 40 to 55. The rubber hardness Hs of the tread portion 2 is more preferably not less than 40 and not greater than 55.

As shown in FIG. 2, in the tire 1 of the present embodiment, the inner edge 11B of each shoulder block 11 extends parallel to the tire circumferential direction.

In this case, during load application, the inner edge 11B of the shoulder block 11 comes into uniform contact with a road surface, and the contact pressure of the land surface of the shoulder block 11 becomes uniform, so that the grip performance is improved. In addition, the entirety of each inner edge 11B can prevent the shoulder block 11 from falling inward, so that a decrease in grip performance due to inward falling can be suppressed.

In a general block tire, the stiffness of a root portion of each block is low, so that the tire starts bending, especially, from a root portion of a shoulder block when a load is applied. Therefore, the shoulder block falls down toward the tread center side, and the grip becomes insufficient due to the land surface of the shoulder block not being in contact with the ground.

In order to solve this problem, the inventors have conducted various experiments, and, as a result, the inventors have found the following findings.

Specifically, each shoulder block 11 is caused to protrude on the outer side in the tire radial direction with respect to the tread surface. Accordingly, the shoulder block 11 comes into contact with a road surface earlier than block that does not protrude, so that the contact pressure becomes higher and the grip force is improved.

Moreover, the side surface S on the center side of each shoulder block 11 is composed of two or more stages of surfaces S1 and S2 toward the groove bottom. Accordingly, bending at the root portion of the shoulder block 11 during load application can be suppressed, so that the shoulder block 11 can be prevented from falling inward.

The grip force during load application of the tire 1 can be drastically improved by combining the above two features.

Figure 4:
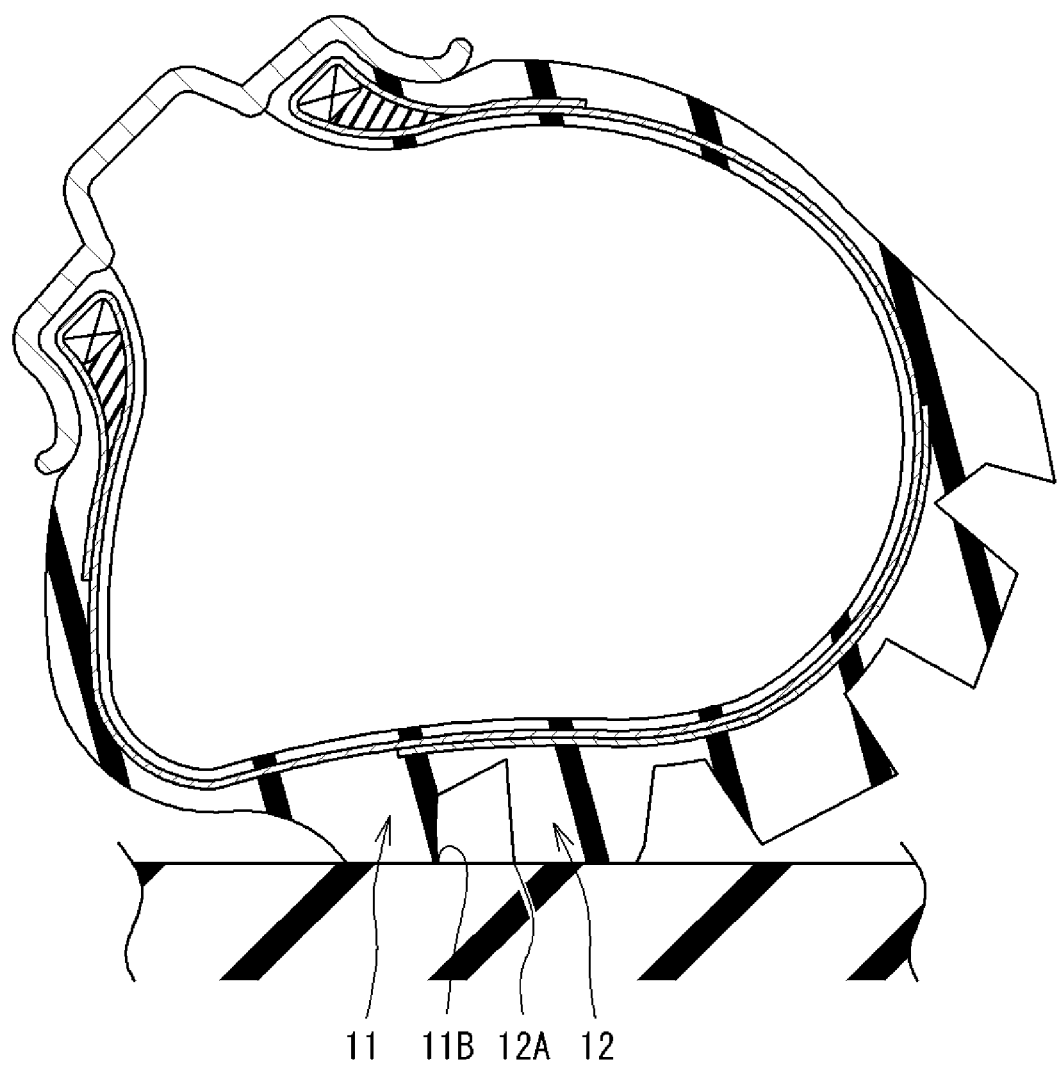
FIG. 4 is a cross-sectional view during running of the tire according to the first embodiment of the present invention.

FIG. 4 is a cross-sectional view during running of the tire 1 of the present embodiment.

Figure 5:
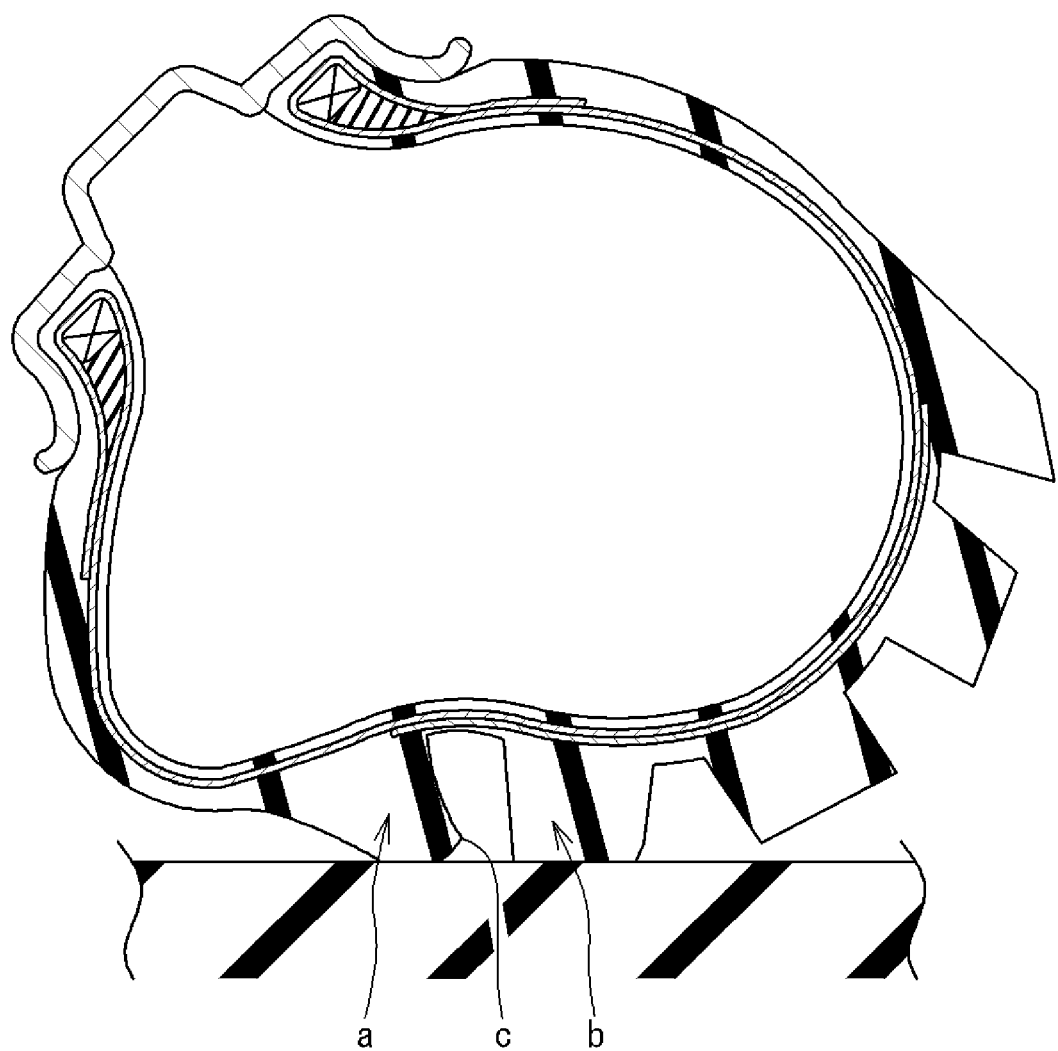
FIG. 5 is a cross-sectional view during finning of a conventional tire.

FIG. 5 is a cross-sectional view during running of a conventional tire.

As shown in FIG. 4, in the tire 1 of the present embodiment, since each shoulder block 11 has a moderate protrusion amount P, and has a root portion whose thickness gradually increases toward the tire center side by the two stages of the side surfaces S1 and S2, the shoulder block 11 does not or is less likely to fall inward toward the tire center side even when a high load is applied.

Therefore, the land surfaces of both the shoulder block 11 and the middle block 12 reliably come into contact with a road surface, so that sufficient grip can be exhibited by the inner edge 11B of the shoulder block 11 and an outer edge 12A of the middle block 12.

On the other hand, as shown in FIG. 5, in the conventional tire which does not have the above protrusion amount P and in which the side surface is composed of one surface, a shoulder block a falls inward toward the tire center side when a high load is applied, so that an inner edge c of the shoulder block a tends to be lifted.

A width W1 in the tire axial direction of the land surface of the shoulder block 11 is preferably smaller than a width W2 in the tire axial direction of the land surface of the middle block 12. The width W1 is, for example, not less than 0.70 times and not greater than 0.85 times the width W2.

Such a shoulder block 11 is likely to become moderately deformed, and serves to increase the ground-contact pressure applied to the middle block 12.

Second Embodiment

The following will describe a second embodiment of the present invention with reference to the drawings.

Figure 6:
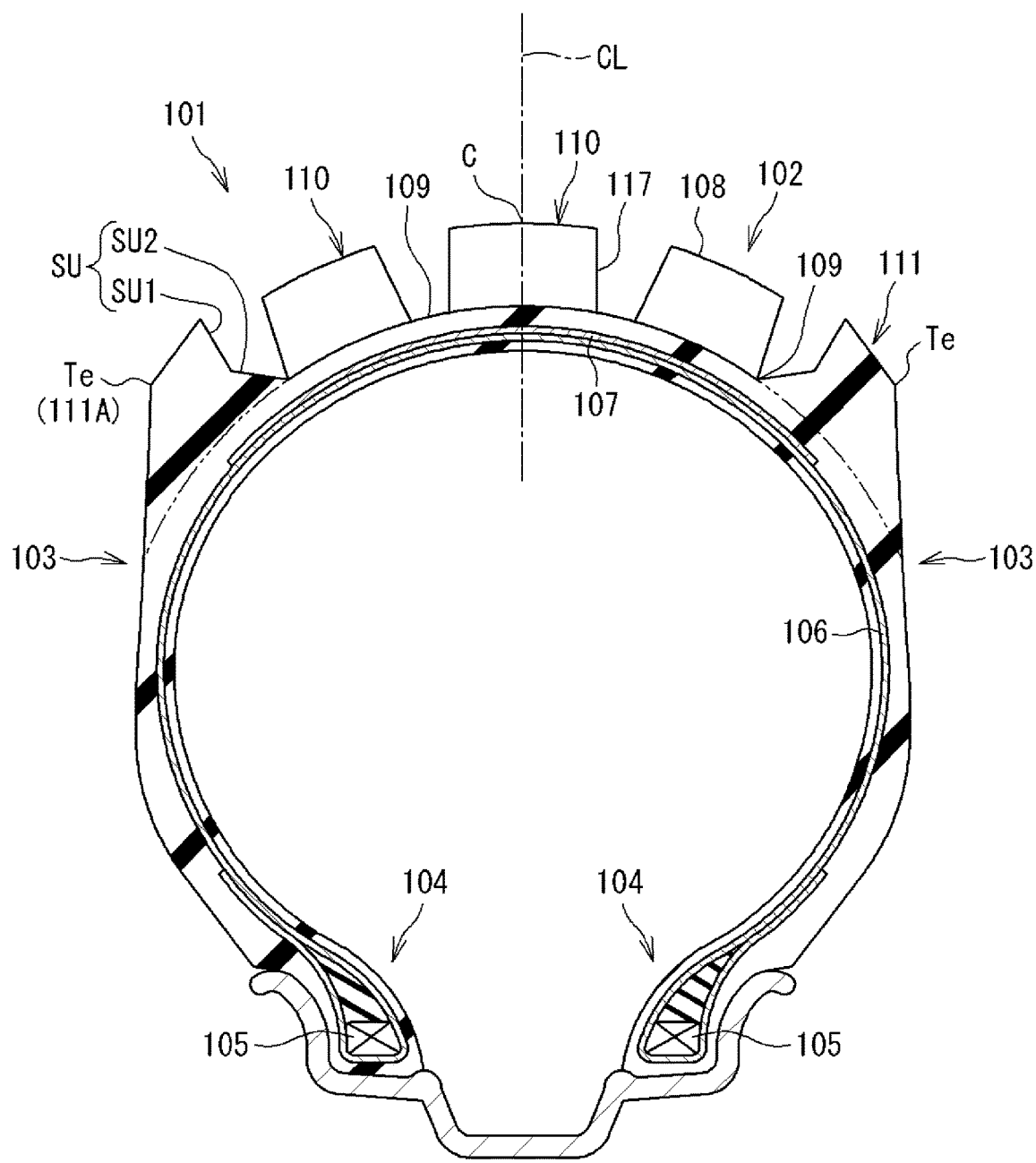
FIG. 6 is a cross-sectional view of a tire according to a second embodiment of the present invention.

FIG. 6 illustrates a rear tire for a trial competition as an example of a tire for a motorcycle for running on rough terrain (hereinafter, also simply referred to as "tire") 101. The tire 101 is used, for example, in a state of being filled with a low internal pressure of 30 to 40 kPa.

FIG. 6 is a tire meridian cross-sectional view of the tire 101 including a tire rotation axis in a normal state.

Figure 7:
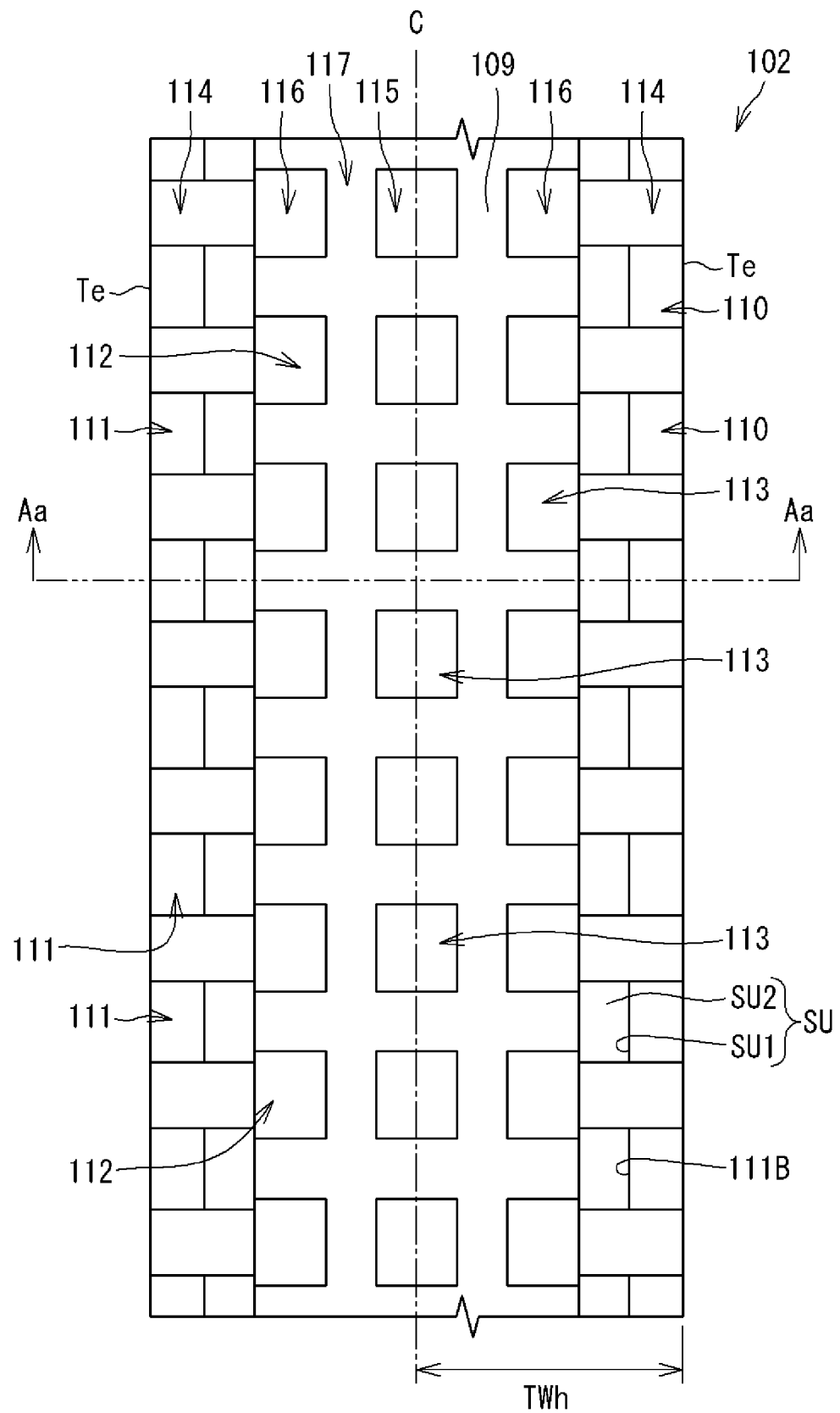
FIG. 7 is a development of a tread portion of the tire in FIG. 6.

FIG. 7 is a development of a tread portion 102 of the tire 101 in FIG. 6. FIG. 6 shows a cross-sectional view taken along a line Aa-Aa in FIG. 7.

As shown in FIG. 6, in addition to the tread portion 102, the tire 101 has, for example, a carcass 106 and a belt layer 107.

The carcass 106 is formed, for example, in a toroid shape extending from the tread portion 102 through each sidewall portion 103 to a bead core 105 embedded in each bead portion 104.

The belt layer 107 is, for example, disposed outward of the carcass 106 in the tire radial direction and inside the tread portion 102 and reinforces the tread portion 102. For the carcass 106 and the belt layer 107, known configurations can be suitably adopted.

In FIG. 6, an alternate long and short dash line CL represents the equator plane of the tire 101. A position indicated by reference sign C is the point of intersection of a tread surface 108 and the equator plane CL. The point of intersection C corresponds to the equator of the tire 101 (tire equator).

An outer surface between two tread ends Te of the tread portion 102 (also outer edges 111A in the tire axial direction of the land surfaces of shoulder blocks 111 described later), that is, the tread surface 108, is curved in an arc shape so as to be convex outward in the tire radial direction.

A plurality of blocks 110 are formed in the tread portion 102 so as to be raised from a groove bottom surface 109. The tread portion 102 includes the plurality of blocks 110.

The tread surface 108 includes the land surfaces of the blocks 110. Of the tread surface 108, a portion other than the land surfaces is a groove 117.

The tread portion 102 is formed from a crosslinked rubber. The tread portion 102 of the tire 101 is formed from a single rubber composition. All of the blocks 110 provided in the tread portion 102 are formed from the same material that is a crosslinked rubber. In the tire 101, the tread portion 102 may be formed such that the material of a portion including each block 110 and the material of the other portion are different from each other.

Each tread end Te means, for example, the outermost edge in the tire axial direction of the block 110 located on the outermost side in the tire axial direction among the blocks 110 formed in the tread portion 102.

As shown in FIG. 7, the tread portion 102 includes, for example, first regions 114, a second region 115, and third regions 116. Each first region 114 is a region from the tread end Te to 25% of a tread development half width TWh.

The second region 115 is a region having a width that is 50% of the tread development half width TWh and having a center located at a tire equator C. Each third region 116 is a region between the first region 114 and the second region 115. The tread development half width TWh is the distance from the tire equator C to the tread end Te when the tread portion 102 is developed.

The blocks 110 include, for example, shoulder blocks 111, middle blocks 112, and crown blocks 113.

Each shoulder block 111 is a block that has a centroid located in the first region 114 and forms the tread end Te. Each middle block 112 is a block that has a centroid located in the third region 116. Each crown block 113 is a block that has a centroid located in the second region 115. In the tire 101 of the present embodiment, each crown block 113 is disposed, for example, on the tire equator C.

As shown in FIG. 7, in the tire 101, a plurality of the shoulder blocks 111 are disposed so as to be spaced apart from each other in the circumferential direction. A portion between two shoulder blocks 111 aligned in the circumferential direction is the groove bottom surface 109. A plurality of the middle blocks 112 are disposed so as to be spaced apart from each other in the circumferential direction. A portion between two middle blocks 112 aligned in the circumferential direction is the groove bottom surface 109. A plurality of the crown blocks 113 are disposed so as to be spaced apart from each other in the circumferential direction. A portion between two crown blocks 113 aligned in the circumferential direction is the groove bottom surface 109.

Each middle block 112 is adjacent to the inner side in the tire axial direction of the shoulder block 111. The middle block 112 overlaps at least a region obtained by extending the shoulder block 111 toward the inner side in the tire axial direction. In the tire 101, an end portion in the tire circumferential direction of the shoulder block 111 and an end portion in the tire circumferential direction of the middle block 112 overlap each other in the axial direction.

In the tire 101 of the present embodiment, the centroid of each middle block 112 is shifted from the centroid of the shoulder block 111 in the tire circumferential direction. However, the tire 101 of the present invention is not limited to such a mode.

Figure 8:
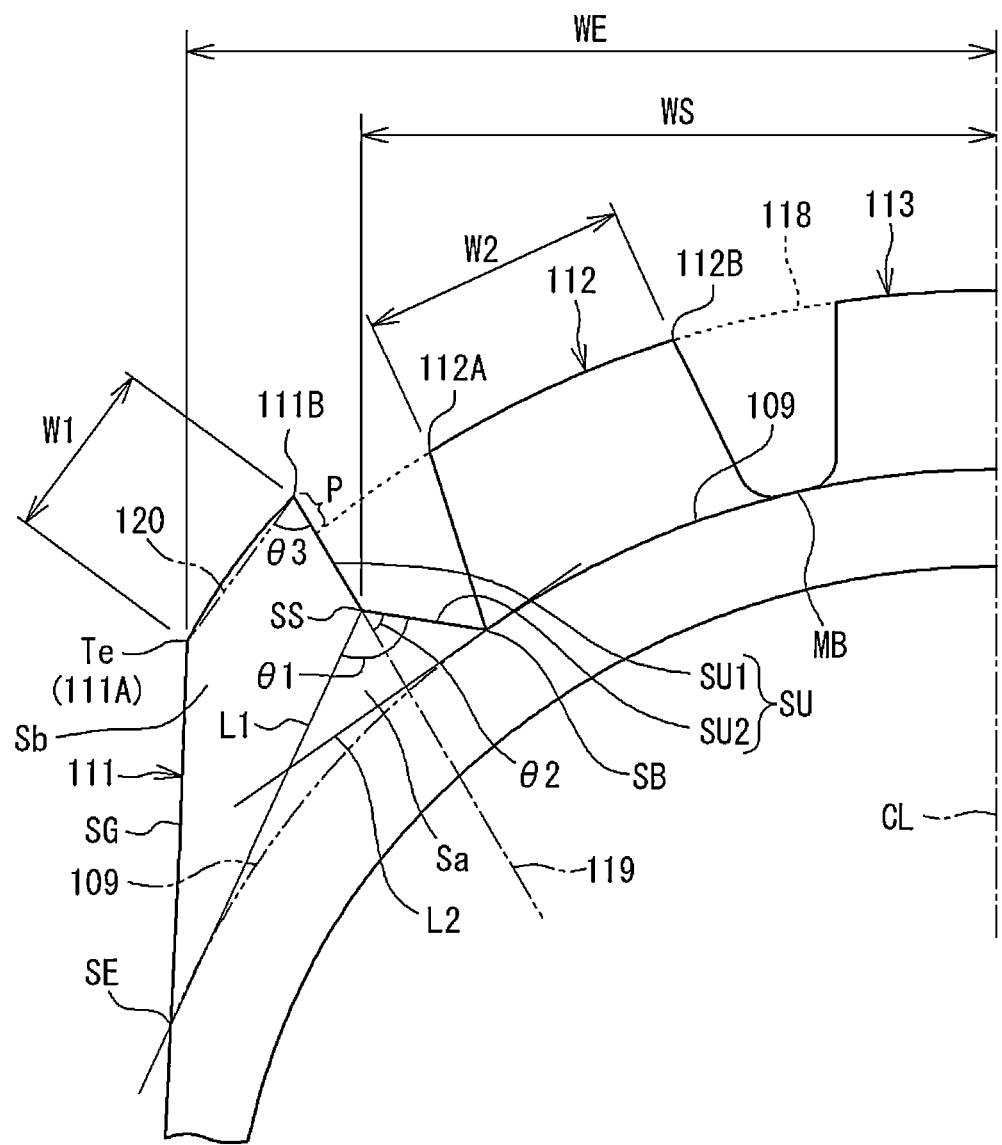
FIG. 8 is an enlarged cross-sectional view of a middle block and a shoulder block of the tire in FIG. 6.

FIG. 8 is an enlarged cross-sectional view of the middle block 112 and the shoulder block 111.

As shown in FIG. 8, in a meridian cross-section including the tire rotation axis in the normal state, an inner edge 111B in the tire axial direction of the land surface of the shoulder block 111 protrudes on the outer side in the tire radial direction with respect to a virtual profile 118 obtained by extending a profile of the land surface of the middle block 112 to the shoulder block 111.

In the tire 101, the inner edge 111B may be included in the virtual profile 118. However, by causing the shoulder block 111 to protrude as shown, the contact pressure during contact with a road surface can be increased, so that the grip force is improved. In addition, the inner edge 111B of the shoulder block 111 provides great grip. From this viewpoint, the inner edge 111B preferably protrudes on the outer side in the tire radial direction with respect to the virtual profile 118.

In this case, a protrusion amount P of the inner edge 111B from the virtual profile 118 (in other words, a protrusion amount P of the shoulder block 111) is preferably not less than 0.5 mm and not greater than 5.0 mm.

This is because, if the protrusion amount P is less than 0.5 mm, a rise in the contact pressure is small and a grip force cannot be ensured. This is also because, if the protrusion amount P is greater than 5.0 mm, the shoulder block 111 excessively protrudes, and the middle block 112 is lifted from a road surface when a load is further applied, resulting in a significant decrease in grip force.

The protrusion amount P is more preferably not less than 2.5 mm and further preferably not less than 3.0 mm, and is more preferably not greater than 4.5 mm and further preferably not greater than 4.0 mm.

As shown in FIG. 8, a side surface SU on the inner side in the tire axial direction (synonymous with the tread center side) of the shoulder block 111 includes the following two side surfaces SU1 and SU2. Out of these side surfaces SU, a second side surface SU2 is a surface inclined toward the tread center side relative to a first side surface SU1.

First side surface SU1: one flat surface extending from the inner edge 111B toward a groove bottom.

Second side surface SU2: one flat surface extending from the bottom side end of the first side surface SU1 toward the groove bottom.

In FIG. 8, reference sign SS indicates the point of intersection of a straight line including the first side surface SU1 and a straight line including the second side surface SU2. The point of intersection SS is the bottom side end of the first side surface SU1. The side surface SU is bent at the bottom side end SS. Reference sign SE indicates the point of intersection of a side surface SG on the outer side in the tire axial direction of the shoulder block 111 and the groove bottom surface 109. The point of intersection SE is the bottom side end of the side surface SG. A straight line L1 is a line segment connecting the bottom side end SS of the first side surface SU1 and the bottom side end SE of the side surface SG on the outer side. In the present disclosure, the line segment L1 is a first reference line.

In FIG. 8, reference sign SB indicates a groove bottom between the shoulder block 111 and the middle block 112. Reference sign MB indicates a groove bottom between the middle block 112 and the crown block 113. The groove bottom SB and the groove bottom MB are included in the groove bottom surface 109. In the meridian cross-section, a profile of the groove bottom surface 109 passes through the groove bottom SB and the groove bottom MB. A straight line L2 is a line segment connecting the groove bottom SB and the first reference line L1 and tangent to the groove bottom surface 109 at the groove bottom SB. In the present disclosure, the line segment L2 is a second reference line. As seen in FIG. 8, the middle block outer side surface and the shoulder block second inner side surface form a tapered shape with the groove bottom SB being an apex In the present disclosure, the area of a region surrounded by the land surface of the shoulder block 111, the first side surface SU1, the first reference line L1, and the side surface SG on the outer side is a main body area Sb, and the area of a region surrounded by the second side surface SU2, the second reference line L2, and the first reference line L1 is a mountain portion area Sa.

Figure 9:
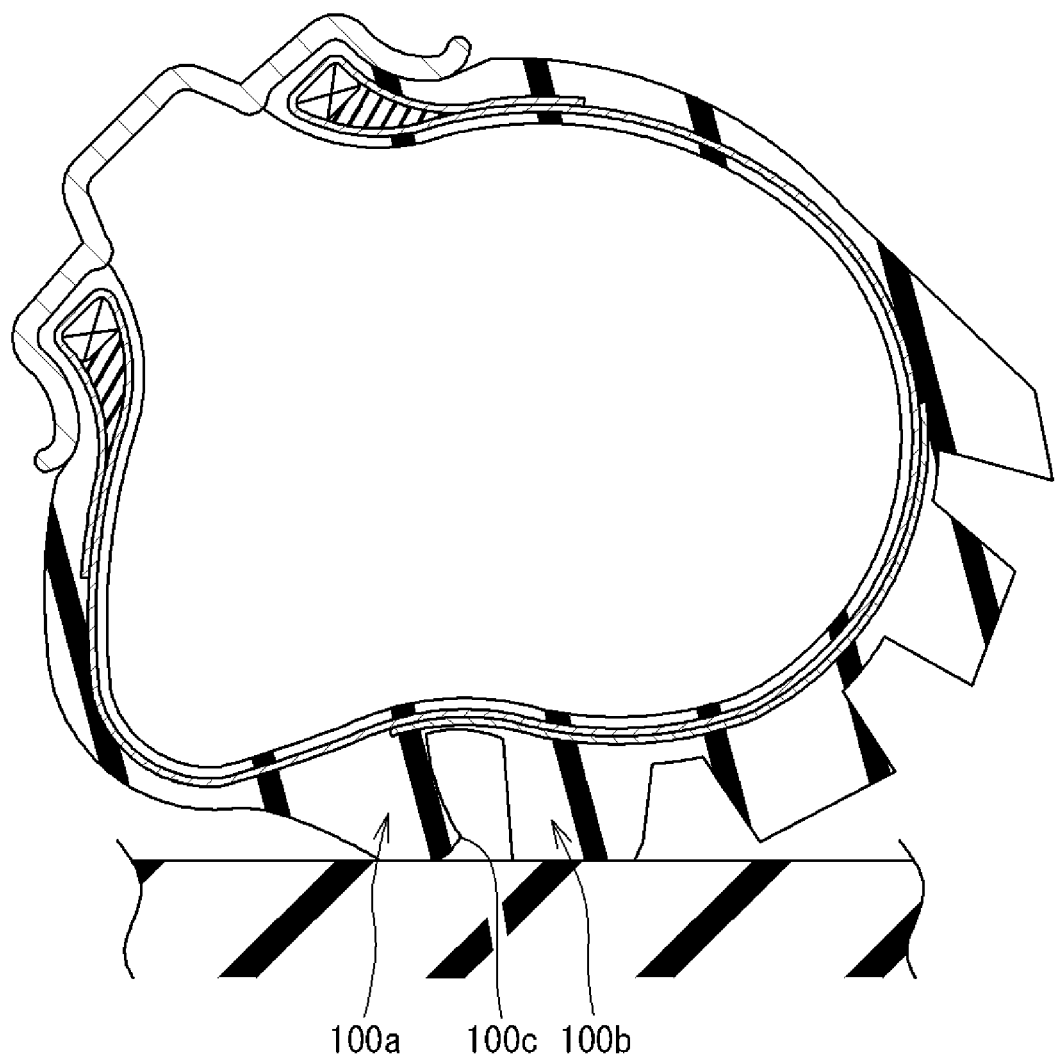
FIG. 9 is a cross-sectional view during running of a conventional tire.

FIG. 9 is a cross-sectional view during running of a conventional tire.

In the conventional tire, the side surface on the inner side of a shoulder block 100a is normally composed of one surface. The stiffness of a root portion of the shoulder block 100a is low, so that the tire starts bending, especially, from a root portion of the shoulder block 100a when a load is applied. Therefore, when a large camber angle is given to the tire and a high load is applied to the shoulder block 100a, the tire shows a tendency that the shoulder block 100a falls inward toward a middle block 100b side (that is, the tire center side) and an inner edge 100c of the shoulder block 100a is lifted from a road surface as shown in FIG. 9. In this case, the grip becomes insufficient due to the land surface of the shoulder block 100a not being in contact with the road surface.

On the other hand, in the tire 101, as described above, the side surface SU on the inner side of the shoulder block 111 includes the first side surface SU1 and the second side surface SU2, and the second side surface SU2 is formed as a surface inclined toward the tread center side relative to the first side surface SU1. In other words, the side surface SU on the center side of the shoulder block 111 is composed of two or more stages of surfaces SU1 and SU2 toward the groove bottom SB. Therefore, the root portion of the shoulder block 111 has a shape in which the root portion becomes gradually thicker toward the groove bottom SB. In particular, in the tire 101, the ratio (Sa/Sb) of the mountain portion area Sa to the main body area Sb is not less than 5%. Therefore, the stiffness of the root portion of the shoulder block 111 is effectively increased, so that the root portion is effectively reinforced. Accordingly, the tire 101 can suppress bending at the root portion of the shoulder block 111 during load application, so that the shoulder block 111 can be prevented from falling inward.

Figure 10:
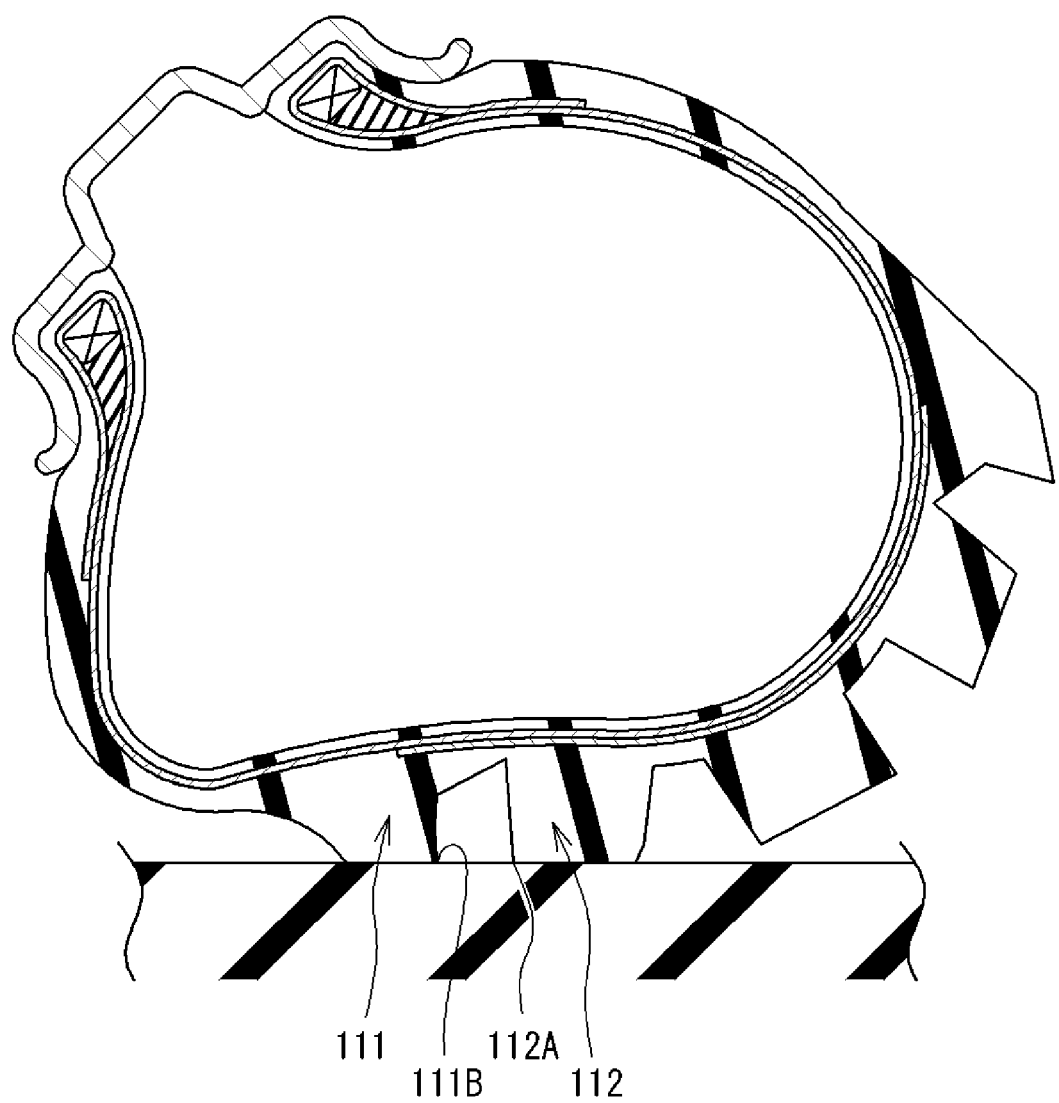
FIG. 10 is a cross-sectional view during running of the tire according to the second embodiment of the present invention.

FIG. 10 is a cross-sectional view during running of the tire 101 of the present embodiment.

As shown in FIG. 10, in the tire 101 of the present embodiment, since the shoulder block 111 has a root portion whose thickness gradually increases toward the tire center side by the two stages of the side surfaces SU1 and SU2, the shoulder block 111 does not or is less likely to fall inward toward the tire center side even when a large camber angle is given to the tire 101 and a high load is applied to the shoulder block 111.

Therefore, the land surfaces of both the shoulder block 111 and the middle block 112 reliably come into contact with a road surface, so that the tire 101 can obtain a sufficient grip force by the inner edge 111B of the shoulder block 111 and an outer edge 112A of the middle block 112. The tire 101 can exhibit excellent grip performance.

As described above, in the tire 101, each shoulder block 111 has a moderate protrusion amount P. A higher load is applied to the shoulder block 111 than to a shoulder block whose inner edge does not protrude. However, in the tire 101, as described above, the root portion of the shoulder block 111 effectively suppresses the occurrence of inward falling of the shoulder block 111. In the tire 101, the inner edge 111B of the shoulder block 111 moderately protrudes. Therefore, despite the fact that a higher load is applied to the shoulder block 111, even when a large camber angle is given to the tire 101 and a high load is applied to the shoulder block 111, the shoulder block 111 does not or is less likely to fall inward toward the tire center side.

On the contrary, since the shoulder block 111 has a moderate protrusion amount P, when a large camber angle is given to the tire 101, the shoulder block 111 comes into contact with a road surface first, so that the contact pressure is effectively increased. The tire 101 can achieve drastic improvement of the grip force during load application.

As described above, in the tire 101, the ratio (Sa/Sb) of the mountain portion area Sa to the main body area Sb is not less than 5%. From the viewpoint of preventing the shoulder block 111 from falling inward, the ratio (Sa/Sb) is more preferably not less than 6%. From the viewpoint of preventing a decrease in absorption properties during load application while maintaining good grip performance, the ratio (Sa/Sb) is preferably not greater than 10% and more preferably not greater than 7%.

In FIG. 8, reference sign θ1 indicates an angle formed by the first reference line L1 and the second side surface SU2 in the meridian cross-section.

In the tire 101, the angle θ1 is preferably not less than 40° and not greater than 170°. Accordingly, inward falling of the shoulder block 111 is effectively suppressed while a decrease in absorption properties during load application is prevented. From this viewpoint, the angle θ1 is more preferably not less than 80°, more preferably not greater than 120°, and further preferably not greater than 100°.

If the angle θ1 is smaller than 40°, the stiffness of the root portion of the shoulder block 111 may become insufficient, so that the shoulder block 111 may fall inward during load application, and the grip performance may be decreased. If the angle θ1 is larger than 170°, the stiffness of the root portion of the shoulder block 111 may be excessively increased, so that the absorption properties during load application may be significantly decreased.

In FIG. 8, reference sign θ2 indicates an angle formed by the second side surface SU2 and a first virtual surface 119 obtained by extending the first side surface SU1 toward the inner side in the tire radial direction. An angle θ3 is an angle formed by the first side surface SU1 and a second virtual surface 120 connecting the outer edge 111A and the inner edge 111B in the tire axial direction of the land surface of the shoulder block 111.

In the tire 101, from the viewpoint that the stiffness of the root portion of the shoulder block 111 can be optimized and the grip performance can be improved without impairing the absorption properties during load application, the angle θ2 is preferably greater than 0° and more preferably not less than 30°, and is preferably smaller than 90° and more preferably not greater than 80°.

In the tire 101, from the viewpoint that the stiffness of the root portion of the shoulder block 111 can be optimized and the grip performance can be improved without impairing the absorption properties during load application, the angle θ3 is preferably not less than 50° and more preferably not less than 55°, and is preferably not greater than 120° and more preferably not greater than 80°.

In FIG. 8, a length indicated by a double-headed arrow WE is the half width in the axial direction of the tread portion 102. The half width WE in the axial direction is the distance in the axial direction from the equator plane CL to the tread end Te. A length indicated by a double-headed arrow WS is the distance in the axial direction from the equator plane CL to the bottom side end SS of the first side surface SU1.

In the tire 101, the ratio (WS/WE) of the distance WS in the axial direction to the half width WE in the axial direction of the tread portion 102 is preferably not less than 65%.

Accordingly, the root portion, of the shoulder block 111, formed as a mountain with the bottom side end SS as a top is disposed at an appropriate position. When a large camber angle is given to the tire 101, the root portion can effectively contribute to suppression of inward falling of the shoulder block 111. In the tire 101, even when a high load is applied to the shoulder block 111, inward falling of the shoulder block 111 is effectively suppressed. The tire 101 can exhibit good grip performance. From this viewpoint, the ratio (WS/WE) is more preferably not less than 70%. The upper limit of the ratio (WS/WE) is determined as appropriate in consideration of the position of the inner edge 111B of the shoulder block 111, and, from the viewpoint that the land surface of the shoulder block 111 can be formed with an appropriate size, the ratio (WS/WE) is preferably not greater than 85%.

In FIG. 8, a length indicated by a double-headed arrow W1 is the width of the land surface of the shoulder block 111. The width W1 is represented as the length of a line segment connecting the outer edge 111A and the inner edge 111B of the shoulder block 111. A length indicated by a double-headed arrow W2 is the width of the land surface of the middle block 112. The width W2 is represented as the length of a line segment connecting the outer edge 112A and an inner edge 112B of the middle block 112.

In the tire 101, the width W1 of the land surface of the shoulder block 111 is preferably smaller than the width W2 of the land surface of the middle block 112. More preferably, the ratio of the width W1 to the width W2 is not less than 0.70 and not greater than 0.85.

Such a shoulder block 111 is likely to become moderately deformed, and serves to increase the ground-contact pressure applied to the middle block 112. The tire 101 can achieve further improvement of grip performance. The width W1 of the land surface of the shoulder block 111 is set in a range of not less than 15% and not greater than 25% of the tread development half width TWh described above.

In the tire 101, a hardness Hs of the tread portion 102 at 25° C. is preferably not less than 40 and not greater than 70.

This is because, if the hardness Hs is less than 40, each block 110 is excessively soft, so that each shoulder block 111 cannot be prevented from falling inward during load application. This is also because, if the hardness Hs is greater than 70, the stiffness of the root portion of the shoulder block 111 is significantly high, so that the absorption properties are deteriorated. The hardness Hs of the tread portion 102 is more preferably not less than 40 and more preferably not greater than 55.

In the present disclosure, the hardness of a component formed form a crosslinked rubber among the components included in the tire is measured according to JIS K6253 under a temperature condition of 25° C. using a type A durometer. In the tire 101, the hardness of each block 110 is measured by bringing the type A durometer into contact with the block 110.

As shown in FIG. 7, in the tire 101 of the present embodiment, the inner edge 111B of each shoulder block 111 extends parallel to the tire circumferential direction.

In this case, the entirety of the inner edge 111B of the shoulder block 111 tends to come into contact with a road surface during load application, so that the contact pressure of the land surface of the shoulder block 111 becomes uniform and the grip performance is improved. In addition, the entirety of each inner edge 111B can prevent the shoulder block 111 from falling inward, so that a decrease in grip performance due to inward falling can be suppressed. From this viewpoint, the inner edge 111B of the shoulder block 111 preferably extends parallel to the tire circumferential direction.

Although the configurations and the effects of the tires for a motorcycle for running on rough terrain according to the embodiments of the present invention have been described above, the present invention is not limited to the above-described embodiments and various modifications can be made to implement the present invention.

For example, in the above-described first embodiment, the second side surface S2 is composed of one flat surface. However, the second side surface S2 may be formed in multiple stages by a plurality of flat surfaces. In addition, the second side surface S2 may be a concavely curved surface not having a flat portion.

For example, in the above-described second embodiment, the second side surface SU2 is composed of one flat surface. However, the second side surface SU2 may be formed in multiple stages by a plurality of flat surfaces. In addition, the second side surface SU2 may be a concavely curved surface not having a flat portion. In this case, the above-described angle $\theta 1$ and angle $\theta 2$ are measured with a line segment connecting the bottom side end SS of the first side surface SU1 and the groove bottom SB as the second side surface SU2.

EXAMPLES

The following will describe the present invention in further detail by means of examples, etc., but the present invention is not limited to these examples.

Experiment 1

Rear tires for a trial competition having the basic structure shown in FIG. 1 and having the tread pattern in FIG. 2 were produced as test tires on the basis of specifications shown in Table 1 (Examples 1 to 6 and Comparative Examples 1 to 3).

As the Comparative Examples, a plurality of tires in which there is no inner edge protrusion amount P or the side surface S is formed in one stage were produced as test tires. The tires of the Comparative Examples have the same configuration as in FIG. 1 and FIG. 2 except for this point. Each test tire was tested for grip performance during low load application and during high load application. The common specifications and the test method for the respective test tires are as follows.

Vehicle used: a motorcycle dedicated for a trial completion and having an engine displacement of 300 cc
Tire size: 120/100-R18 (rear wheel)
Rim size: 2.15×18 (rear wheel)
Internal pressure: 30 kPa The test method is as follows.

<Grip Performance During Low Load Application and During High Load Application>

Sensory evaluation was made by a driver for grip performance during low load application (grip performance in a state where the stroke amount of a rear suspension was mainly less than 60%) and grip performance during high load application (grip performance in a state where the stroke amount of the rear suspension was mainly not less than 60%) when the vehicle having each test tire mounted thereon was caused to run on a trial course. The results are scores with the result of Comparative Example 1 being regarded as 100. A higher value indicates that each grip performance is better. The test results are as shown in Table 1.

TABLE 1

|  | Comp. Ex. 1 | Comp. Ex. 2 | Comp. Ex. 3 | Ex. 1 | Ex. 2 | Ex. 3 | Ex. 4 | Ex. 5 | Ex. 6 |
| --- | --- | --- | --- | --- | --- | --- | --- | --- | --- |
| Presence/absence of protrusion of inner edge | Absence | Presence | Absence | Presence | Presence | Presence | Presence | Presence | Presence |
| Cross-sectional shape of side surface | One stage | One stage | Two stages | Two stages | Two stages | Two stages | Two stages | Two stages | Two stages |
| Angle α | 0 | 0 | 40 | 40 | 40 | 40 | 140 | 80 | 80 |
| Whether shoulder block is parallel to circumferential direction | Yes | Yes | No | Yes | Yes | No | Yes | Yes | No |
| Protrusion amount P of inner edge [mm] | 3 | 4 | 3 | 3 | 6 | 3 | 3 | 1 | 1 |
| Grip performance during low load application (score) | 100 | 110 | 95 | 130 | 140 | 130 | 130 | 120 | 120 |
| Grip performance during high load application (score) | 100 | 95 | 110 | 120 | 95 | 105 | 120 | 120 | 115 |
| Absorption performance during high load application (score) | 100 | 100 | 100 | 100 | 100 | 100 | 80 | 100 | 100 |
| Total score | 300 | 305 | 305 | 350 | 335 | 335 | 330 | 340 | 335 |

As a result of the test, it is confirmed that the tire of each Example exhibits excellent grip performance both during low load application and during high load application.

Experiment 2

Rear tires for a trial competition having the basic structure shown in FIG. 6 and having the tread pattern in FIG. 7 were produced as test tires on the basis of specifications shown in Table 2 (Examples 101 to 104 and Comparative Examples 101 to 103). A carcass having a bias structure was used as a carcass.

As Comparative Example 101, a tire in which the side surface SU is formed in one stage (i.e., the ratio (Sa/Sb) is 0%) was produced as a test tire. The tire of Comparative Example 101 has the same configuration as in FIG. 6 and FIG. 7 except for this point. Each test tire was tested for grip performance of the tire when a large camber angle was given and a high load was applied. The common specifications and the test method for the respective test tires are as follows.
- Vehicle used: a motorcycle dedicated for a trial completion and having an engine displacement of 300 cc
- Tire size: 120/100-R18 (rear Wheel)
- Rim size: 2.15×18 (rear wheel)
- Internal pressure: 30 kPa The test method is as follows.
<Grip Performance During High Load Application with High Camber>

Sensory evaluation was made by a rider for grip performance when the rider drove the vehicle having each test tire mounted thereon on a trial course, a large camber angle was given, and a high load was applied to the test tire. The results are scores with a maximum score of 10 points. A higher value indicates that the grip performance during high load application with a high camber is better. The test results are as shown in Table 2.

TABLE 2

|  | Comp. Ex. 101 | Comp. Ex. 103 | Comp. Ex. 102 | Ex. 102 | Ex. 101 | Ex. 104 | Ex. 103 |
|---|---|---|---|---|---|---|---|
| Sa/Sb [%] | 0 | 1 | 3 | 5 | 5 | 5 | 7 |
| θ1 [°] | — | 70 | 70 | 80 | 90 | 100 | 90 |
| WS/WE [%] | — | 70 | 70 | 70 | 70 | 70 | 70 |
| P [mm] | 0.5 | 0.5 | 0.5 | 0.5 | 0.5 | 0.5 | 0.5 |
| Grip performance | 5.0 | 5.2 | 5.4 | 6.0 | 6.2 | 6.1 | 5.8 |

As a result of the test, it is confirmed that the tire of each Example exhibits excellent grip performance during high load application with a high camber.

REFERENCE SIGNS LIST 1, 101 tire
2, 102 tread portion
9, 109 groove bottom surface
10, 110 block
11, 111 shoulder block
11A, 111A outer edge
11B, 111B inner edge
12, 112 middle block
18, 118 virtual profile
19, 119 first virtual surface
20, 120 second virtual surface
Te tread end
S, SU side surface
S1, SU1 first side surface
S2, SU2 second side surface
α angle formed by first virtual surface and second side surface
β angle formed by second virtual surface and first side surface
P protrusion amount
L1 first reference line
L2 second reference line

The invention claimed is:

1. A tire for a motorcycle for running on rough terrain, the tire comprising a tread portion, wherein
the tread portion includes a plurality of blocks raised from a groove bottom surface,
the plurality of blocks include a plurality of shoulder blocks forming tread ends, and a plurality of middle blocks adjacent to inner sides in a tire axial direction of the shoulder blocks,
in a meridian cross-section including a tire rotation axis in a normal state which is a state where the tire is fitted on a normal rim with a normal internal pressure and no load is applied to the tire, an inner edge in the tire axial direction of a land surface of each shoulder block protrudes on an outer side in a tire radial direction with respect to a virtual profile obtained by extending a profile of a land surface of the middle block to the shoulder block,
an inner side surface on the inner side in the tire axial direction of each shoulder block includes one first inner side surface extending from the axially inner edge toward a groove bottom between the shoulder block and the middle block, and a second inner side surface extending from a bottom side end of the first inner side surface toward the groove bottom,
the shoulder block second inner side surface is a surface inclined toward the inner side in the tire axial direction relative to the first inner side surface,
the shoulder block first and second inner side surfaces each include a flat surface,
a middle block outer side surface on the outer side in the tire axial direction of each middle block includes a flat surface and extends from an outer edge in the tire axial direction of a land surface of each middle block toward the groove bottom,
a bottom side end of the middle block outer side surface of each middle block is adjacent to the groove bottom,
in the meridian cross-section, contours of the flat surfaces of the shoulder block first and second inner side surfaces, as well as the middle block outer side surface, are all represented by a straight line,
the bottom side end of the shoulder block first inner side surface is located axially outward of a normal line of the land surface of each shoulder block at the axially inner edge,
a bottom side end of the shoulder block second inner side surface is adjacent to the groove bottom, and
the middle block outer side surface and the shoulder block second inner side surface form a tapered shape with the groove bottom being an apex,
an angle formed by the shoulder block second inner side surface and a first virtual surface obtained by extending the shoulder block first inner side surface toward an inner side in the tire radial direction is greater than 30° and not greater than 80°,
an angle formed by the shoulder block first inner side surface and a second virtual surface connecting an outer edge and the inner edge in the tire axial direction of the land surface of the shoulder block is not less than 55° and not greater than 80°, a line segment connecting the bottom side end of the shoulder block first inner side surface and a bottom side end of a shoulder block outer side surface on the outer side in the tire axial direction of the shoulder block is a first reference line, and a line segment connecting the groove bottom between the shoulder block and the middle block and the first reference line and tangent to the groove bottom surface at the groove bottom is a second reference line, an area of a region surrounded by the land surface of the shoulder block, the shoulder block first inner side surface, the first reference line, and the shoulder block outer side surface is defined as a main body area, and an area of a region surrounded by the shoulder block second inner side surface, the second reference line, and the first reference line is defined as a mountain portion area, a ratio of the mountain portion area to the main body area is not less than 5% and not greater than 7%, an angle formed by the first reference line and the shoulder block second inner side surface is not less than 80° and not greater than 100°, and a ratio of a distance in the axial direction from a tire equator plane to the bottom side end of the shoulder block first inner side surface to a distance in the axial direction from the tire equator plane to the tread end is not less than 70% and not greater than 85%.

2. The tire for a motorcycle for running on rough terrain according to claim 1, wherein an outer edge in the tire axial direction of the land surface of the shoulder block extends parallel to a tire circumferential direction.

3. The tire for a motorcycle for running on rough terrain according to claim 1, wherein a protrusion amount of the shoulder block is not less than 0.5 mm and not greater than 5.0 mm.

4. The tire for a motorcycle for running on rough terrain according to claim 1, wherein a rubber hardness at room temperature of 25° C. of the tread portion is not less than 40 and not greater than 70.

5. The tire for a motorcycle for running on rough terrain according to claim 1, wherein a protrusion amount of the shoulder block is not less than 0.5 mm.

6. The tire for a motorcycle for running on rough terrain according to claim 1, wherein the groove bottom between the shoulder block and the middle block is located axially inward of a center of the groove in a width direction of the groove.

7. The tire for a motorcycle for running on rough terrain according to claim 1, wherein in the meridian cross-section, the middle block outer side surface is longer than the shoulder block first inner side surface.

8. The tire for a motorcycle for running on rough terrain according to claim 1, wherein
the groove bottom between the shoulder block and the middle block is located axially inward of a center of the groove in a width direction of the groove, and
in the meridian cross-section, the middle block outer side surface is longer than the shoulder block first inner side surface.

* * * * *